Aug. 15, 1944.   J. S. BYRNE   2,355,780
VARIABLE SPEED FLUID DRIVE TRANSMISSION
Filed Sept. 8, 1941   7 Sheets-Sheet 1
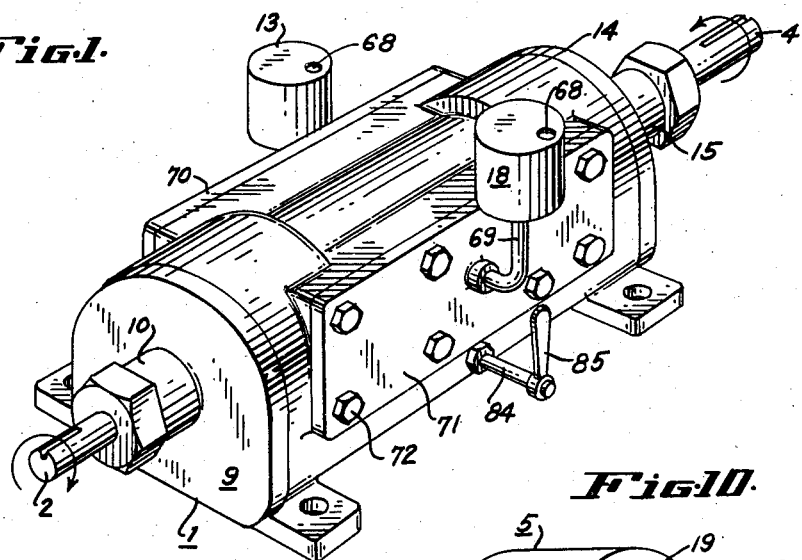
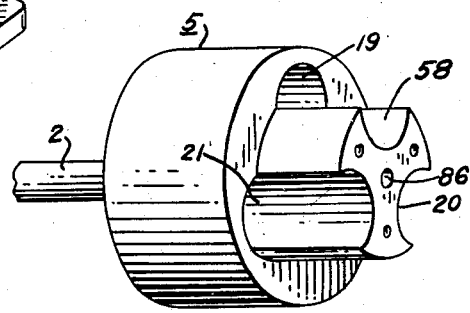
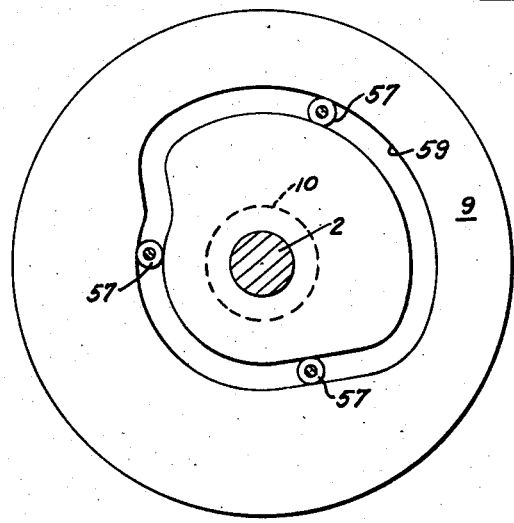
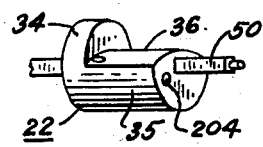
INVENTOR.
JOHN S. BYRNE
BY
Chas. E. Townsend
ATTORNEY.

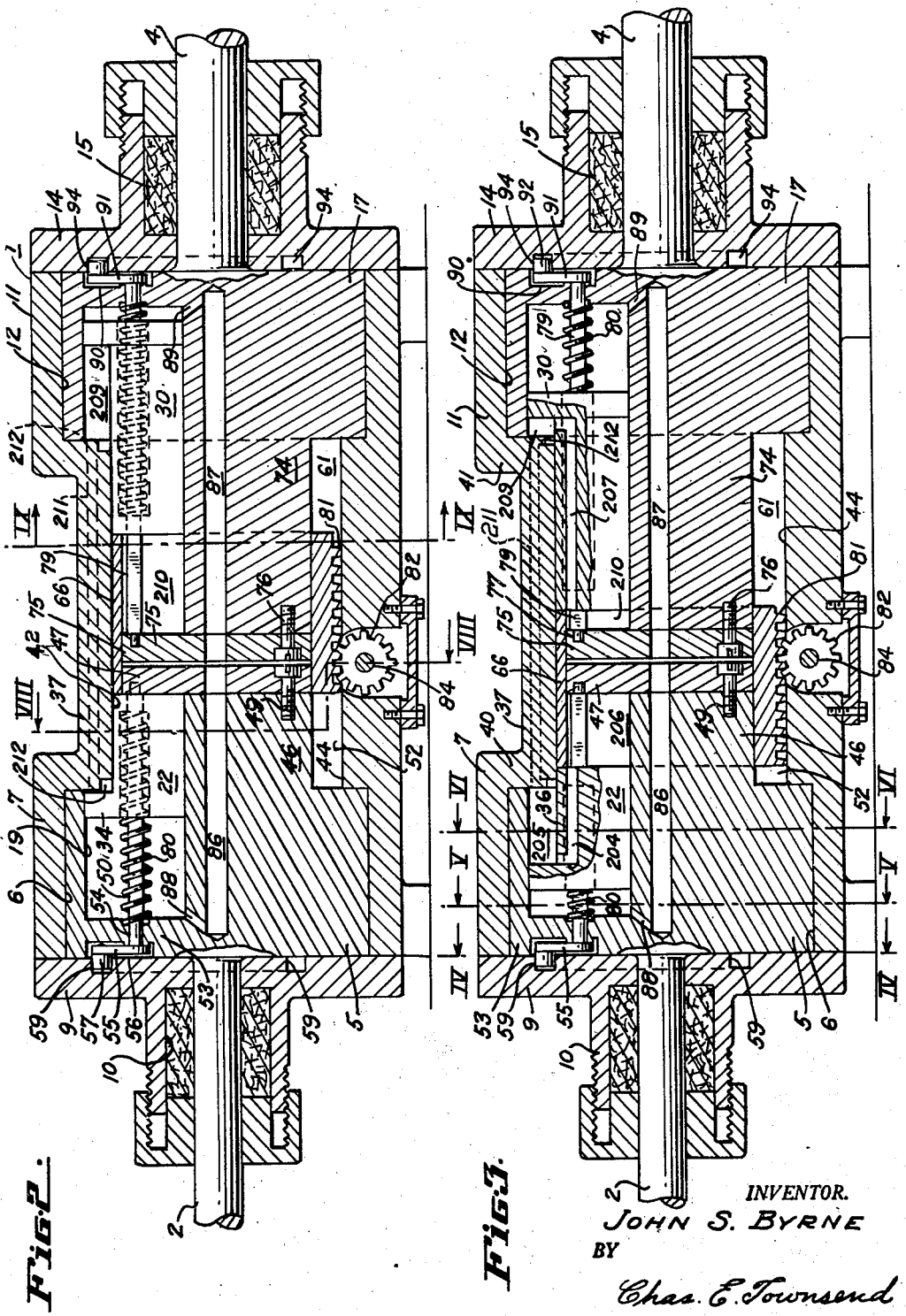

Aug. 15, 1944.   J. S. BYRNE   2,355,780
VARIABLE SPEED FLUID DRIVE TRANSMISSION
Filed Sept. 8, 1941   7 Sheets-Sheet 3

INVENTOR.
JOHN S. BYRNE
BY
Chas. E. Townsend
ATTORNEY.

Aug. 15, 1944.   J. S. BYRNE   2,355,780
VARIABLE SPEED FLUID DRIVE TRANSMISSION
Filed Sept. 8, 1941   7 Sheets-Sheet 4

INVENTOR.
JOHN S. BYRNE
BY
Chas. E. Townsend
ATTORNEY.

Aug. 15, 1944.  J. S. BYRNE  2,355,780
VARIABLE SPEED FLUID DRIVE TRANSMISSION
Filed Sept. 8, 1941  7 Sheets-Sheet 5
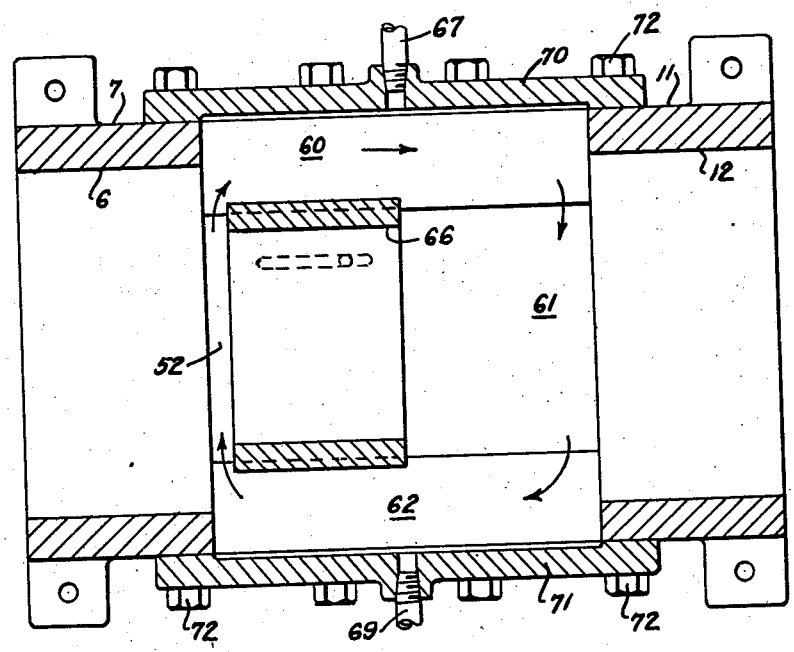
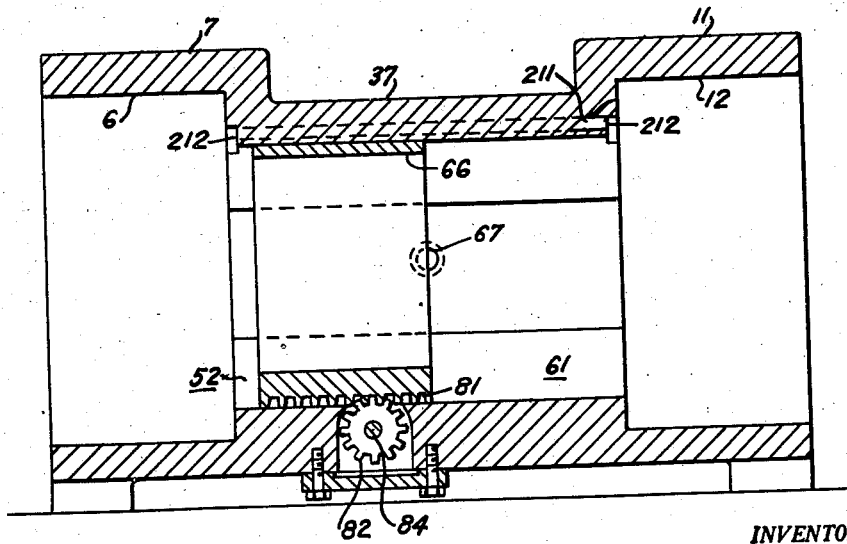
INVENTOR.
JOHN S. BYRNE
BY
Chas. E. Townsend
ATTORNEY.

Aug. 15, 1944.   J. S. BYRNE   2,355,780
VARIABLE SPEED FLUID DRIVE TRANSMISSION
Filed Sept. 8, 1941   7 Sheets-Sheet 6

INVENTOR.
JOHN S. BYRNE
BY
Chas. E. Townsend
ATTORNEY.

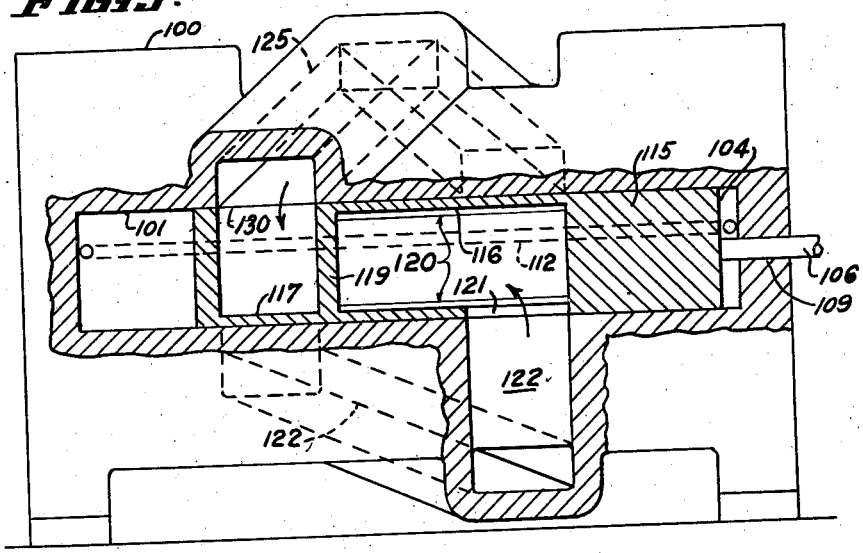
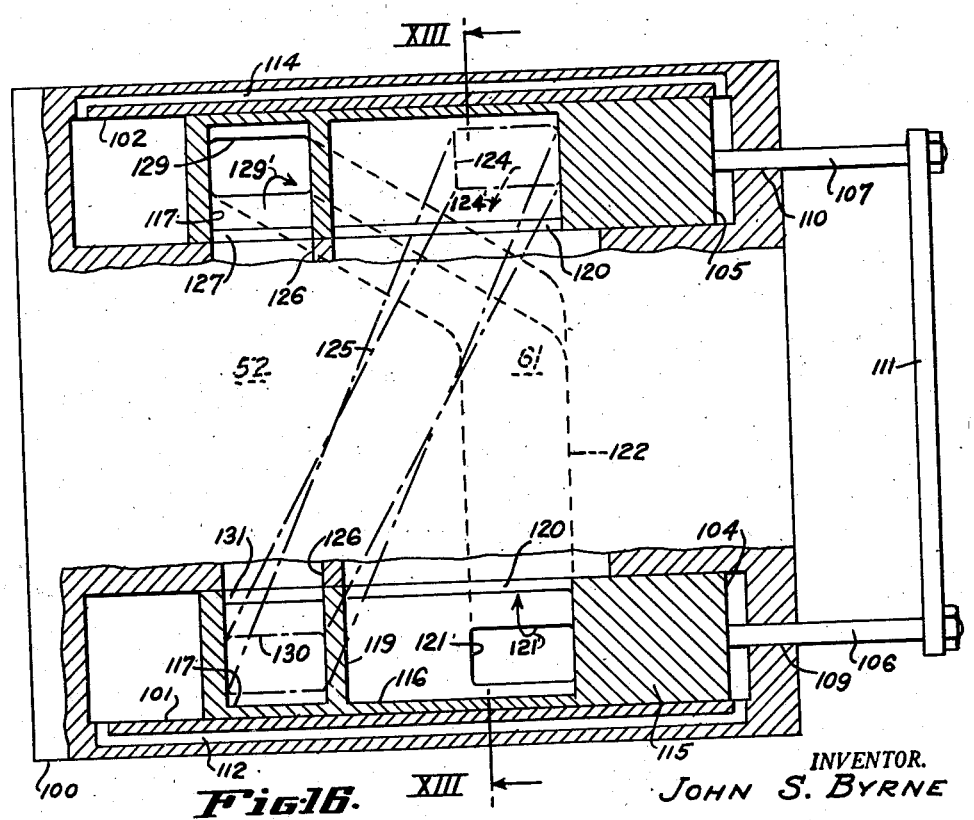

Patented Aug. 15, 1944

2,355,780

UNITED STATES PATENT OFFICE 2,355,780

VARIABLE SPEED FLUID DRIVE TRANSMISSION

John S. Byrne, Oakland, Calif.

Application September 8, 1941, Serial No. 409,965

5 Claims. (Cl. 60—53)

My invention relates to variable speed transmissions, and particularly to a fluid transmission arranged to operate through a continuously variable series of ratios between the speeds of the driving and driven shafts.

Methods of transmitting an even flow of power from a prime mover to a load through a considerable range of speeds have been given a great deal of attention. A number of arrangements have been developed using a fluid medium, in which a stress may be set up by direct means, such as a reciprocating pump piston, or to which a high momentum may be imparted, as in centrifugal pumps, and the output controlled by varying the piston stroke or area, the ratio of effective areas between driving and driven impeller blades, the size of an orifice between power input and power output chambers, or equivalent means.

All such methods have certain drawbacks, an example of which is the leakage past adjacent impellers, or the mechanical complications and losses attendant on reciprocating pump action.

In the present invention, the fluid medium is circulated from the driving chamber to a driven chamber and back, the entire operation taking place in a sealed housing to prevent leakage. The driving force is applied to the fluid through rockable rotary impeller blades, and a similar set of blades, in turn driven by the fluid, transmits the power to the load. A continuous variation in the speed and torque ratios is obtained by inversely changing the relative areas effective in the driving and driven impellers.

The objects of my invention are:

The provision of an efficient means of varying, through an infinite number of steps, the speed ratio between a driving and a driven member;

To provide a positive action transmission of fluid type;

To eliminate slippage in a fluid transmission;

To provide a readily reversible fluid transmission;

To permit infinite variations in torque delivered to a load; and

To deliver very high starting torques to a load and progressively change to the lower torques required to maintain operation at running speed, without perceptible steps in the changing of the torque and speed ratios.

These and other objects will be apparent to those skilled in the art from the following description of a preferred embodiment of my invention. It is to be understood that these objects are exemplary only of the purposes of my invention, and that the structural embodiments shown may be modified as required to adapt it to such other uses as may be deemed advisable.

In the drawings:

Fig. 1 is a perspective view of the assembled device.

Fig. 2 is a sectional side view of my transmission, set to operate at a 1:1 speed ratio.

Fig. 3 is a view similar to that of Fig. 2 but showing the device set to operate at a speed ratio of substantially 8:1.

Fig. 4 is a sectional view, taken along line IV—IV of Fig. 3, showing the cam plate and track controlling the impeller blade positions.

Fig. 7 is a perspective detail of one of the impeller blades.

Fig. 10 is a perspective, broken-away view of the driving member.

Fig. 11 is a horizontal section through the housing, taken in the plane of the drive shaft axis, the other elements being omitted for clarity.

Fig. 12 is a side view of the speed ratio changing elements and housing, illustrated in section, with other parts removed for ease of understanding.

Fig. 15 is a sectional view of the reversing mechanism, taken in the same plane as Fig. 14 but set for rotation of the driving and driven shafts in the same direction.

Fig. 16 is a top schematic view of the reversing mechanism in position corresponding to that of Fig. 15.

Figure 5:
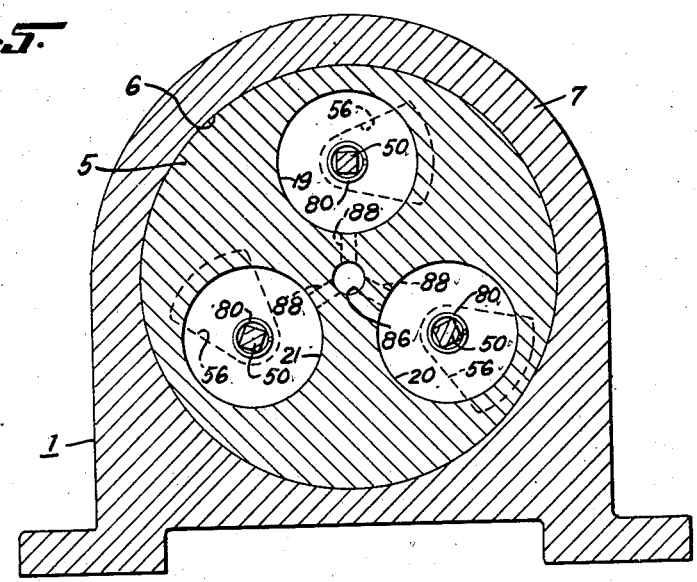
Fig. 5 is a transverse section, showing the impeller blade mounting bores and rods, taken on line V—V of Fig. 3.
Figure 6:
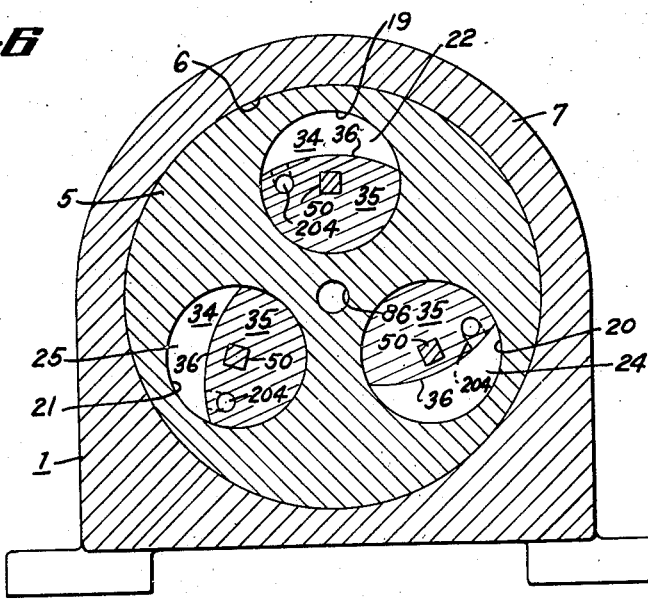
Fig. 6 is a transverse section, taken on line VI—VI of Fig. 3.

Returning now to Fig. 1, the transmission, generally denominated 1, is interposed between the driving shaft 2 and the driven shaft 4. The driving shaft 2 is attached to any conventional prime mover (not illustrated) and the driven shaft is connected to a load, also omitted from the figures.

The driven shaft 4 has been illustrated as being of a diameter substantially exceeding that of the driving shaft 2, since it is contemplated that the usual mode of operation will be that of reducing the speed and increasing the torque in the driven shaft. Obviously, these relations may be varied in accordance with the needs of the particular service for which the transmission is designed.

A cylindrical driving member 5 is secured to or formed integrally with the driving shaft 2, and rotates within a cylindrical driving end bore 6 formed in the driving end housing 7 of transmission 1. The outer end of chamber 6 is closed by a driving end plate 9 incorporating a packing gland 10, of conventional design suitable to restrain high pressure, secured to the housing 7 by usual means, such as bolts, omitted from the drawings as an aid to clarity.

At the opposite or driven end 11 of housing 1 is formed a cylindrical driven end bore 12, closed terminally about driven shaft 4 by a driven end plate 14 having a pressure-sealing packing gland 15 similar to gland 10 formed integrally therewith. Within the driven end bore 12 is rotatably mounted a driven member 17, with which is formed integrally a driven shaft 4. Oil reservoirs 13 and 18 are mounted along the sides of the device and feed thereinto, as will be set out hereafter.

Apart from dimensional differences in the driven and driving shafts 2 and 4 and between the sealing glands 10 and 15 disposed therearound, both ends of the device are symmetrical, as so far described.

Driving member 5 has formed therein three evenly spaced cylindrical bores 19, 20 and 21, in which are seated driving impellers 22, 24 and 25, respectively. Driven member 17 has corresponding bores 26, 27 and 29 in which are disposed driven impellers 30, 31 and 32, respectively. Since the driving impellers are identical, only one will be described in detail together with its accompanying mounting in the driving member 5. Impeller 22 comprises a cylindrical body portion 34 fitting snugly within bore 19 and a blade portion 35 formed by cutting away the body portion on one side at 36, so that it can extend into a compression chamber, described hereafter, of lesser diameter than bore 19.

Driving member 5 and the driven member 17 are partially enclosed on their adjacent sides by a reduced diameter central portion 37 of the housing which extends between the driving end housing 7 and the driven end housing portion 11. Inner end walls 40 and 41 join central housing portion 37 to the housing portions 7 and 11, respectively, and act to prevent axial movement of the driving and driven members 5 and 17.

Within the central housing portion 37 the surface is not a cylinder but a compound of two coaxial cylindrical sectors of different radii. The upper portion 42 has a smaller radius than does the lower surface 44, and the two surfaces are connected at the sides by portions 45 of changing curvature, affording a smooth transition therebetween. Into the chamber 48 thus formed extends a reduced diameter portion 46 of the driving member 5. Bores 19, 20 and 21 continue through reduced diameter portion 46, but constitute therein cylindrical sectors, the outer portion of the circumference of each bore being cut away by the reduction in diameter of the member 5. The inner ends of bores 19, 20 and 21 are closed transversely by a cylindrical inner driving end plate 47 secured to reduced diameter portion 46 by conventional means, such as bolts 49.

The impeller 22 is thus housed within a congruently curved supporting chamber 58, surrounding it completely for a portion of its length and partially for the remainder thereof. The impeller is freely slidable axially of this supporting surface and along a square shaft 50 passing centrally through the impeller and journaled in the end plates 53 and 47. The cutaway surface 36 of the impeller is made with the same radius of curvature as the upper surface 42 of the central chamber 48 so that the impeller may slidably engage therewith during any part of its traversal axially along square shaft 50 between the terminal limits defined by the end plates 53 and 47.

Figure 8:
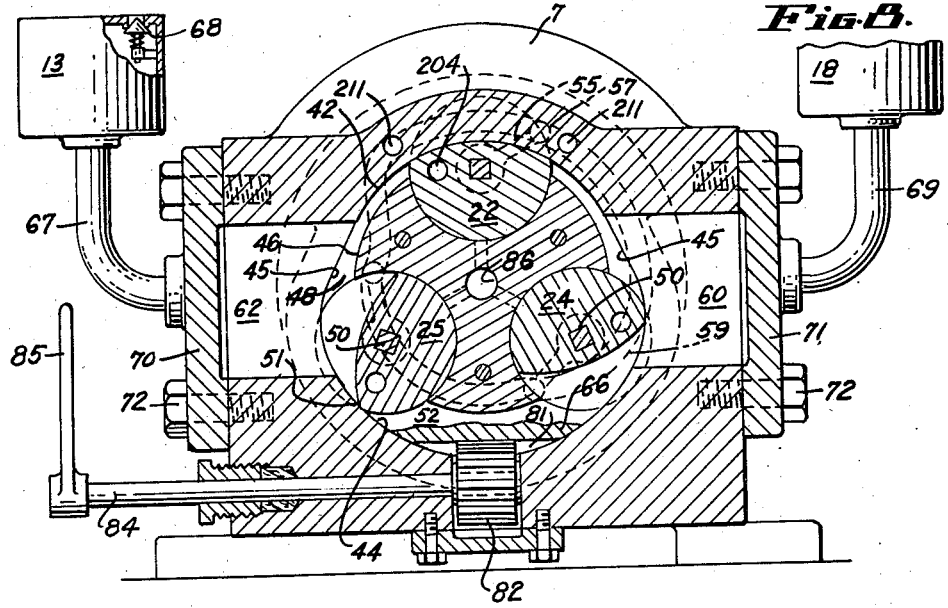
Fig. 8 is a transverse section, taken along line VIII—VIII of Fig. 2, showing the working chamber, driving impeller blades, and ratio-changing mechanism.
Figure 9:
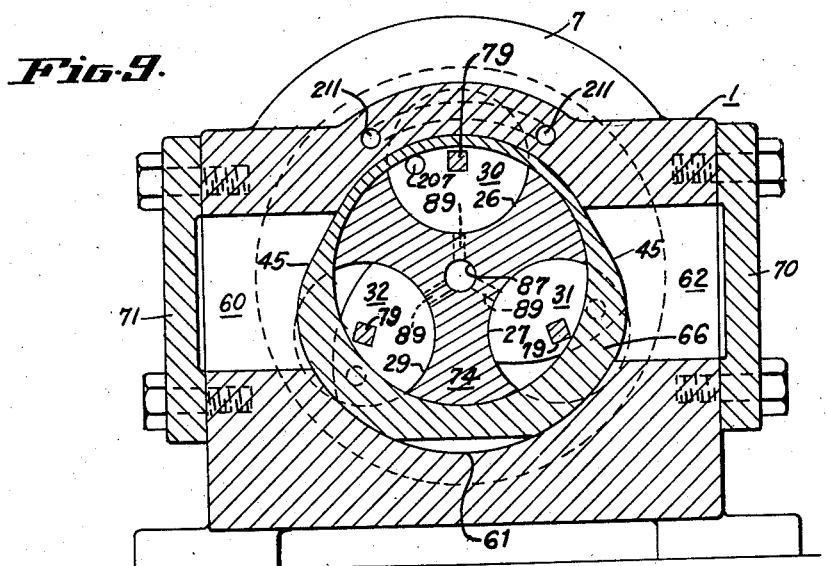
Fig. 9 is a transverse sectional view, taken along line IX—IX of Fig. 2, showing the arrangement of the driven end elements.

It will be noted by reference to Fig. 8 that when the impeller 22 is at top dead center the surface 36 (Fig. 7) is in contact with small diameter surface 42 of chamber 48. Were the impeller to be maintained in this same position relative to the reduced diameter portion 46 of the driving member as the impeller moved into the lower portion 44 of the chamber it would not contact the wall thereof because of the increased diameter of the lower portion. If, however, the impeller is rocked clockwise on its shaft, the leading edge 51, formed by the intersection of the blade surfaces 35 and 36, will engage surface 44 and close off the driving chamber space 52 between the impeller and the housing. Thus a stress may be set up in the fluid medium by rocking the impeller blade 22 and continuing rotation of the driving member 5. The mechanism for producing the proper angle of rocking of the impeller is illustrated in Fig. 4 and in dotted lines in Fig. 8.

The square shaft 50, on which the impeller blade is mounted, extends through a suitable journal 54 in outer end 53 of driving member 5. A cam lever 55 is fixed thereto and is movable within an arcuate recess 56 cut into the outer side of driving member outer end 53. Cam roller 57 is rotatably mounted on cam lever 55 and projects axially from member 5 into engagement with a cam track 59 cut into driving end plate 9.

Track 59 is shaped to cause lever 55 to hold the cut away impeller surface 36 congruently with the upper chamber surface 42 as it moves through the upper part of its rotational arc, and to turn the impeller gradually as it travels past the variable radius portion 45, so that when it reaches the lower curved chamber surface 44, the portion of greatest radius of curvature, the leading edge 51 will engage therewith to form a closure or partition, shutting off the chamber space 52. Further rotation of the driving shaft 2 will then exert pressure on the fluid medium, not shown, contained in chamber space 52 and compel it to flow through passage 60 into the chamber 61, where it operates on a similar impeller blade arrangement to drive the load and then returns to chamber 52 through return passage 62. The shape of the passages 60 and 62 between the chambers 52 and 61, respectively, is shown to best advantage in Figs. 11 and 12, in which the impellers have been removed for clarity.

In Fig. 11 the driving end bore 6 and the driven end bore 12 are seen, defined terminally at their inner end walls 40 and 41. Between the chamber 52 and the chamber 61, into which the reduced diameter driving member portion 46 and the corresponding reduced diameter driven member portion 74, respectively, extend when the device is completely assembled, the collar 66 is shown. This collar 66 provides the adjustment of torque and speed, as will be seen hereafter.

Passages 60 and 62 are rectangular slots formed longitudinally through the side walls of the central portion 37 of the housing and closed on the outside by side cover plates 70 and 71 attached to the housing by bolts 72. The inner boundary of each passage is formed by the outside of collar 66. Oil feed pipes 67 and 69 from reservoirs 13 and 18 communicate with passages 60 and 62 through plates 70 and 71, respectively, to maintain the supply of oil. As oil is withdrawn from reservoirs 13 and 18, air is drawn therein through snifter valves 68, shown in Fig. 8, and provides a cushioning effect during operation.

The driving impeller shafts 50 and the inner end plate 47 in which they are journaled extend into the collar 66 at the driving end, while from the driven end, the reduced diameter driven end member 74 extends thereinto. The driven end reduced diameter member 74 is identical with the corresponding driving end member 46 except that it is of somewhat greater length, when the driven end torque is to be equal to or greater than the driving end torque, as shown. If a speed increase is desired, the driven end member would be made shorter than the driving end member. The impeller bores in member 17 are terminated centrally by a cylindrical inner driven end plate 75 secured thereto by suitable means, as bolts 76, and having therein journals 77 for the inner end of square shafts 79. The inner end plates 47 and 75 are separated by a short distance, so that there may be no interference by either with the rotation of the other.

About the square shafts 50 and 79 and based against the end walls of the driving and driven members 5 and 12 are disposed compressed springs 80. These springs tend to force the impeller blades along the shafts 50 toward the center of the housing and into contact terminally with the collar 66. Thus at all times both driving and driven impeller blades extend into chamber 48 as far as permitted by collar 66, which thereby divides the chamber 48 into the chamber 52 and the chamber 61. The collar 66 is traversible axially of chamber 48 by means of a rack 81 formed along the bottom thereof and meshing with a pinion 82 driven through a shaft 84 by an external crank 85. Traversing collar 66 axially of chamber 48 exposes an inversely varying area of the driving and driven impeller blades to contact with the fluid medium, which has been omitted from all the figures for the sake of clarity.

In order to permit this axial traversal of the impeller blades, I have provided communicating central bores 86 and 87 in driving member 5 and driven member 17. Bore 86 opens behind the driving impellers 22, 24 and 25 into impeller bores 19, 20 and 21 through passages 88. Bore 87 opens behind driven impellers 30, 31 and 32 into driven impeller bores 26, 27 and 29 through passages 89. When the collar 66 is traversed, the oil in driving bores 19, 20 and 21 and driven bores 26, 27 and 29 is free to adjust itself to the changes in impeller bore volume through the central bores 86 and 87.

Similarly, the fluid in driving bores 19, 20 and 21 and driven bores 26, 27 and 29, between the driving and driven members 5 and 17, is permitted to adjust itself during shifting of the collar. A bore 204 is formed in each of the driving impellers to connect the bore spaces 205 and 206 ahead of the impeller cylindrical body member 34 and within collar 66, respectively. A corresponding bore 207 in the driven impellers links bore spaces 209 and 210, disposed inwardly from the driven impeller cylindrical body portion 34 and within collar 66, respectively. Driving bore space 205 and driven bore space 210 are directly connected by housing passages 211 grooved terminally at 212 to permit functioning when the impellers are at the inner limits of their traverse. This system of passages allows shifting the impellers axially without any hydraulic binding.

The work done at the driven shaft 4 will be the same, less friction, as that transmitted to the driving shaft 2. Operating as the device does in a closed chamber, the product of the turning moment and the impeller area at the driving end will equal the corresponding product at the driven end, less friction. If the collar 66 is positioned as in Fig. 2 so that equal impeller areas are exposed in chambers 52 and 61, the torque and speed ratio will be 1:1. If collar 66 is moved to the position of Figs. 3 and 12, the ratio of exposed areas and hence of torque will be roughly 1:8 between the driving and driven ends. That is, driven shaft 4 will revolve once for every eight revolutions of driving shaft 2, but will exert eight times as much torque, or turning moment. The smaller the driving end impeller blade area is exposed, the greater the reduction of speed and corresponding increase of torque at the driven end.

The same sort of cam arrangement is used at the driven end to control the angular position of the impeller blades as is used at the driving end. Arcuate recesses 90 receive cam arms 91 fixed on square shafts 79, and cam rollers 92, pivotally mounted on arms 91, project into a cam track 94 cut into end plate 14.

The transmission as thus far described allows an operator to vary the speed and torque delivered to a load over wide limits, with rotation in a fixed direction, the driven shaft always turning oppositely to the driving shaft.

In Figs. 13–16, I have illustrated a modification of the structure of Figs. 1–12, which will permit reversing the direction of rotation of the driven shaft at will. An expanded housing 100 provides for formation of cylindrical valve chambers 101 and 102 along each side thereof parallel to the axis of the drive shafts 2 and 4 in a substantially similar position to that occupied by the passages 60 and 62 in the showing of Figs. 11 and 12 and space for suitable valve passages described hereafter. Cylindrical valves 104 and 105 are slidably disposed in these chambers and are traversed axially thereof in unison by valve rods 106 and 107 extending out of housing 100 through suitable sealed glands 109 and 110 and fixed to a transverse valve control bar 111. Passages 112 and 114 are formed in communication with the opposite ends of the valve chambers 101 and 102, respectively, to permit free traversal of the valves 104 and 105 in a bath of oil or other pressure medium.

Figure 14:
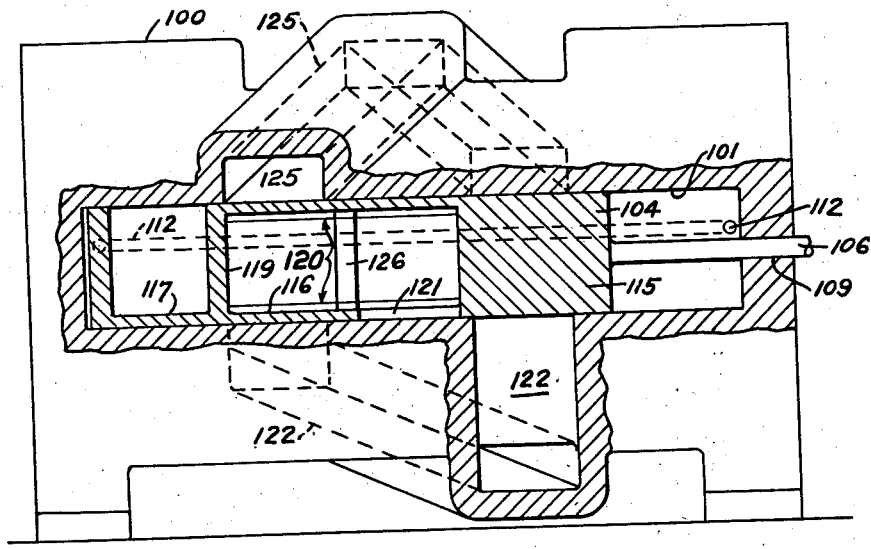
Fig. 14 is a schematic side view, in section, of the reversing mechanism of Fig. 13, taken as indicated by line XIV—XIV of that figure with the valve set for rotation in the normal opposite directions of the driving and driven shafts.

Each of the cylindrical valves 104 and 105 comprises an elongated solid body 115, in which is formed a long chamber 116 and a short chamber 117, separated by a wall 118. Chamber 116 is elongated axially of the valve and is open through lateral port 120 into the chamber 61, when in reversed position, as shown in Figs. 15 and 16, and into both chambers 52 and 61 when in normal position, as shown in Fig. 14. Chamber 116 in valve 104 also has a downwardly opening port 121 communicating in reversing position with a lower reversing passage 122. Chamber 116 of valve 105 has an upwardly opening port 124 communicating in reversing position with an upper reversing passage 125.

In the normal position of the valves, ports 121 and 124 are out of registry with upper and lower reversing passages 122 and 125 as shown in Fig. 14. The lateral ports 120, being open to both chambers 52 and 61, permit normal flow of oil through valve chambers 116 and around body partitions 126 which otherwise block communication therebetween. This mode of operation is identical with that of the prior embodiment.

Figure 13:
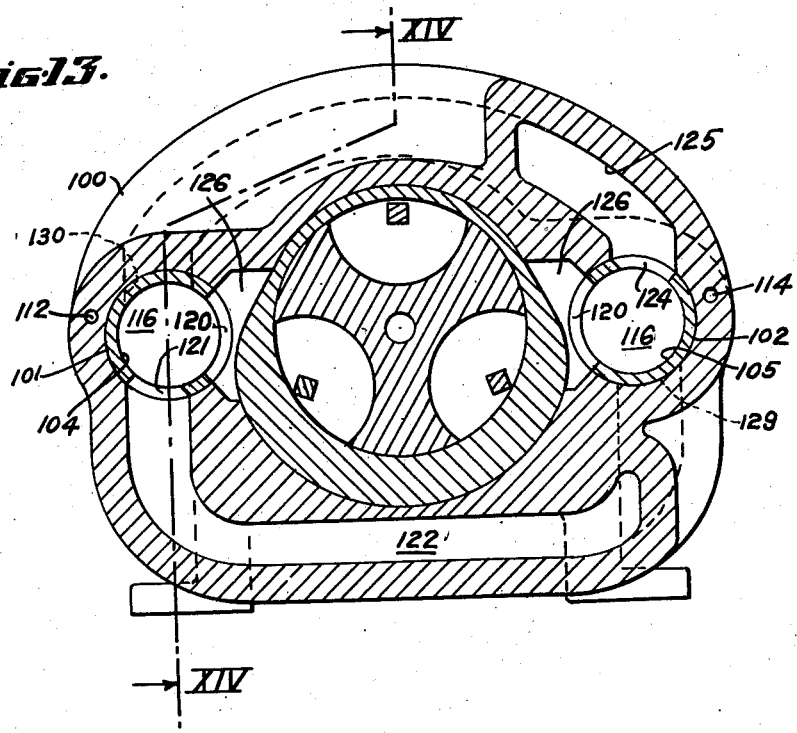
Fig. 13 is a schematic transverse sectional view of an alternative embodiment of my invention, arranged to permit reversal and set for rotation of both shafts in the same direction, taken along line XIII—XIII of Fig. 16.

In the reversing position of the valves, as shown in Figs. 13, 15 and 16, the fluid under pressure from the driving chamber 52 is delivered into the short chamber 117 of valve 105 through a lateral valve port 127, as shown in Fig. 16, and passes downwardly through a port 129 as indicated by the arrow 129' from chamber 117 into the lower reversing passage 122. Lower reversing passage 122 guides the fluid downwardly, across beneath the working chambers and upwardly at the opposite end of the housing where it enters valve chamber 116 of valve 104 through the downwardly opening port 121 as indicated by the arrow 121', and emerges through the laterally opening port 120 into the chamber 61. After performing its work, it leaves chamber 61 through the lateral port 120 of valve 105, emerges upwardly through port 124 as indicated by arrow 124' into upper reversing passage 125, is carried thereby diagonally above the working chambers, down through upwardly opening port 130 into short chamber 117 of valve 104, and is returned from the short valve chamber through a lateral port 131, as shown in Fig. 16, into the chamber 52 for a repetition of the cycle.

The reversing mechanism as described is substantial, simple in operation, and has no complicated parts to give trouble, and no special means are necessary to seal the valve elements.

In summary, my invention meets the need for a transmission affording a continuously variable ratio of torques. Any ratio desired may be utilized by a simple lever control. Few working parts are required, and it is not necessary to have extremely close tolerances. Lubrication is simplified, since all parts operate in a bath of oil continuously. A modified embodiment is shown for use when it is desired to reverse the direction of rotation.

I claim:

1. A fluid transmission, comprising a housing, an eccentric bore formed in said housing, a collar congruent with and axially slidable within said eccentric bore, passages formed in said housing forming a closed loop through said bore around said collar, impeller-supporting members rotatably disposed within said housing, reduced diameter impeller-supporting member portions extending axially toward the center of said housing, a bore formed axially in said collar and arranged to receive rotatably therein said reduced diameter impeller-supporting member portion, impeller blades rockably mounted in said impeller-supporting members, cam tracks formed at each end of said housing, a cam arm fixed to each of said blades and arranged to engage one of said cam tracks to rock said blade into sealing contact with said eccentric bore, said blades terminally engaging said collar, resilient means for urging said blades axially against said collar, and means for traversing said collar axially of said housing.

2. A fluid transmission, comprising a housing, an eccentric bore formed in said housing, a collar congruent with and axially slidable within said eccentric bore, passages formed in said housing forming a closed loop through said bore around said collar, impeller-supporting members rotatably disposed within said housing, reduced diameter impeller-supporting member portions extending axially toward the center of said housing, a bore formed axially in said collar and arranged to receive rotatably therein said reduced diameter impeller-supporting member portion, impeller blades rockably mounted in said impeller-supporting members, cam tracks formed at each end of said housing, a cam arm fixed to each of said blades and arranged to engage one of said cam tracks to rock said blade into sealing contact with said eccentric bore, said blades terminally engaging said collar, resilient means for urging said blades axially against said collar, a rack formed axially of said collar, a pinion disposed in said housing engaging said rack, external means for rotating said pinion, and means for permitting shifting of fluid from end to end of said housing between said impeller mounting members independently of flow through said closed loop.

3. In a variable ratio transmission, the combination of a housing, a drive shaft and a driven shaft journaled in said housing at opposite ends thereof, an impeller mounting member fixed to said drive shaft, an impeller mounting member fixed to said driven shaft, a reduced diameter portion extending axially from each of said impeller mounting members toward the center of said housing, an eccentric chamber formed centrally of said housing, a similarly eccentric collar arranged to fit slidably therein and bored to receive said reduced diameter portions movably therewithin and defining two portions of said chamber, bores formed in said driving and driven impeller mounting members, square shafts mounted coaxially in said bores, blades disposed rockably in said bores and slidably mounted on said square shafts, means for urging said blades parallel to the axis and toward the center of said housing, a cam track formed in each end of said housing, a cam arm fixed to each of said square shafts and engaging said track to maintain a sliding seal between said blades and said eccentric chamber, passages formed axially in said driving and driven impeller mounting members communicating between the outer ends of said bores, passages formed in said housing for communication between the inner ends of said bores, passages forming a loop through said housing between the said portions of said chamber, and means for traversing said collar axially of said eccentric bore.

4. In a variable ratio transmission, the combination of a housing, a drive shaft and a driven shaft journaled in said housing at opposite ends thereof, an impeller mounting member fixed to said drive shaft rotatably within said housing, an impeller mounting member fixed to said driven shaft rotatably within the opposite end of said housing, a reduced diameter portion extending axially from each of said impeller mounting members toward the center of said housing, an eccentric chamber formed centrally of said housing, a similarly eccentric collar arranged to fit slidably therein and bored to receive said reduced diameter portions movably therewithin and defining two portions of said chamber, bores formed in said driving and driven impeller mounting members, square shafts mounted coaxially in said bores, blades disposed rockably in said bores and slidably mounted on said square shafts, means for urging said blades parallel to the axis and toward the center of said housing, a cam track formed in each end of said housing, a cam arm fixed to each of said square shafts and engaging said track to maintain a sliding seal between said blades and said eccentric chamber, passages formed axially in said driving and driven impeller mounting members communicating between the outer ends of said bores, pressure medium passages connecting the said portions of said chamber, and valves disposed slidably in said housing arranged selectively to provide oppositely directed passages between said portions of said chamber.

5. In a variable ratio transmission, the combination of a housing, a drive shaft and a driven shaft journaled in said housing at opposite ends thereof, an impeller mounting member fixed to said drive shaft rotatably within said housing, an impeller mounting member fixed to said driven shaft rotatably within the opposite end of said housing, a reduced diameter portion extending axially from each of said impeller mounting members toward the center of said housing, an eccentric chamber formed centrally of said housing, a similarly eccentric collar arranged to fit slidably therein and bored to receive said reduced diameter portions movably therewithin and defining two portions of said chamber, bores formed in said driving and driven impeller mounting members, square shafts mounted coaxially in said bores, blades disposed rockably in said bores and slidably mounted on said square shafts, means for urging said blades parallel to the axis and toward the center of said housing, a cam track formed in each end of said housing, a cam arm fixed to each of said square shafts and engaging said track to maintain a sliding seal between said blades and said eccentric chamber, and means for selectively controlling the path of fluid to said portions of said chamber.

JOHN S. BYRNE.